(12) United States Patent
Marshall et al.

(10) Patent No.: US 6,535,219 B1
(45) Date of Patent: Mar. 18, 2003

(54) METHOD AND APPARATUS TO DISPLAY OBJECTS IN A COMPUTER SYSTEM

(75) Inventors: Carl S. Marshall, Portland, OR (US); Marc S. Blackstein, Hillsboro, OR (US); Adam T. Lake, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,301

(22) Filed: Mar. 30, 2000

(51) Int. Cl.[7] ............................................. G06T 15/00
(52) U.S. Cl. ...................................................... 345/581
(58) Field of Search .................................. 345/619, 419, 345/422, 620, 627, 628, 581, 582

(56) References Cited

U.S. PATENT DOCUMENTS 6,115,050 A * 9/2000 Landau et al. .............. 345/433

* cited by examiner

*Primary Examiner*—Phu K. Nguyen
(74) *Attorney, Agent, or Firm*—Blakely, Sokoloff, Taylor & Zafman LLP

(57) ABSTRACT

A method in a computer system includes identifying faces of a mesh which share an edge and identifying normals of vertices of the faces not included by the edge. The depth components of the normals are multiplied in camera space. When the product of multiplying the depth components of the normals has a first sign, the edge is identified as a silhouette edge.

15 Claims, 7 Drawing Sheets

METHOD AND APPARATUS TO DISPLAY OBJECTS IN A COMPUTER SYSTEM

BACKGROUND

1. Field

The invention relates to the display of three dimensional (3D) objects in a computer system.

2. Background Information

Computer systems are increasingly used to display 3D objects. As used herein, the term computer system refers to any device comprising a processor and a memory to store instructions and data to be supplied to the processor. Typically, the processor and memory are coupled by way of one or more buses. A collection of instructions e.g. software, may be executed to display a representation of a 3D object on a display device. Example display devices include monitors, flat screens, liquid crystal displays, and other technologies well known in the art. The term "object", as used herein, refers to a representation using digital signals of something with three perceivable dimensions. For example, an object might be a digital representation of a car, a creature, a house, and so on. Typically, the digital representation of 3D objects in computer systems is accomplished by way of "meshes" or "wireframes" which comprise collections of 3D coordinates (commonly referred to as vertices) and connections between the vertices, commonly referred to as edges. Collectively, the points and edges may define triangles or other polygons, each typically confined to a plane. The regions defined by the polygons are commonly referred to as "faces".

Objects may be fully or partially "opaque", that is, when displayed the object may at least partially occlude the display of information which is meant to appear behind the object on the display. For example, an object representing a car displayed on a background comprising a house and a driveway might partially occlude the display of the house and the driveway so that the car appears parked in front of the house and on top of the driveway.

Opacity of objects is often accomplished by mapping the display of color sets onto the faces. These color sets are typically referred to as "textures", "image maps", "surfaces", and so on. The mapping of textures to faces may be referred to as "texture mapping". Texture mapping can result in objects which appear more realistic. For example, using texture mapping an object representing a dinosaur may be displayed with realistic lizard-like skin. However, texture mapping is computationally expensive, with the computational complexity increasing as the number of points and polygons of the object increase. Increased computational complexity may result in reduced performance when display position, view angle, lighting angle, and so on for an object are changed. Performance penalties may be especially pronounced when multiple updates occur within a small period of time. There is therefore a continuing need for a manner of displaying 3D objects with reduced computational complexity.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

DETAILED DESCRIPTION

The embodiments described herein are merely illustrative, and one skilled in the art will appreciate that numerous modifications can be made which nonetheless fall within the scope of the present invention.

Figure 1:
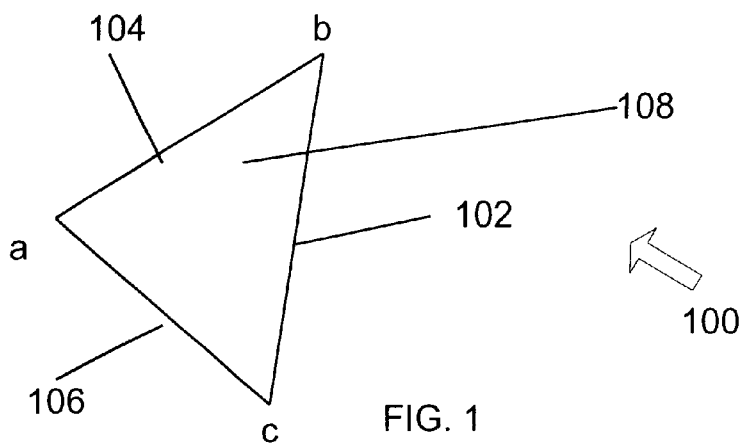
FIG. 1 shows a polygon embodiment in accordance with one embodiment of the present invention.

FIG. 1 shows an embodiment of a polygon 100 which may form part of a 3D object. Polygon 100 comprises vertices a, b, and c. Vertex pairs ab, bc, and ac define edges of the polygon. Vertex pair ab defines edge 104; bc defines edge 102; and ac defines edge 106. Face 108 is the planar area bounded by the polygon 100. A typical 3D object may comprise tens, hundreds, or even thousands of polygons.

Figure 2:
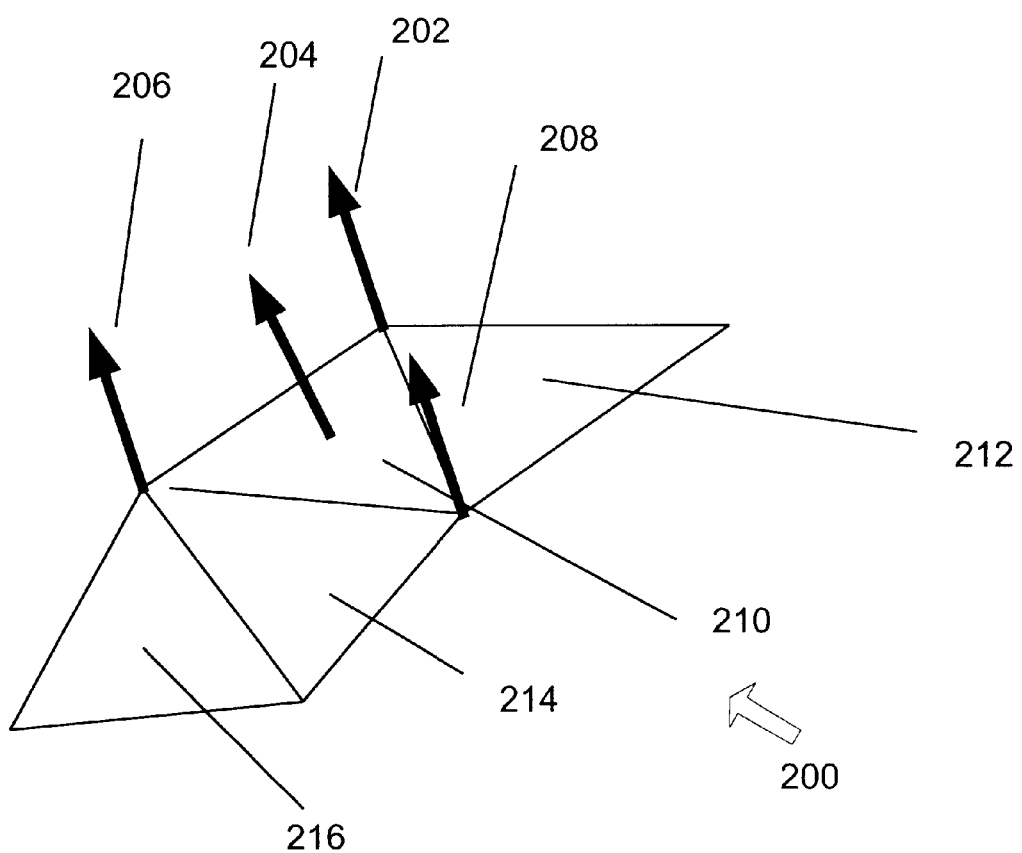
FIG. 2 shows a mesh portion embodiment in accordance with one embodiment of the present invention.

FIG. 2 shows a mesh portion of an embodiment of a 3D object in accordance with the present invention. Mesh portion 200 comprises multiple polygons having faces 216, 214, 210, and 212. Henceforth polygons and their faces shall be referred to interchangeably. A face normal 204 of polygon 210 may be determined by computing the cross product of two vectors in the plane which comprises the face of the polygon 210. Each polygon has three vertices, each vertex having an associated normal vector referred to as the vertex normal. Vertex normals are shown for polygon 210 but not for the other polygons so as not to obscure the description. Vertex normals are typically determined by averaging the face normals of all faces which share the vertex. Polygon 210 has vertex normals 208, 202, and 206. An edge normal may be defined for each edge of polygon 210 by computing the average of the vertex normals of the vertices of the edge.

Figure 3:
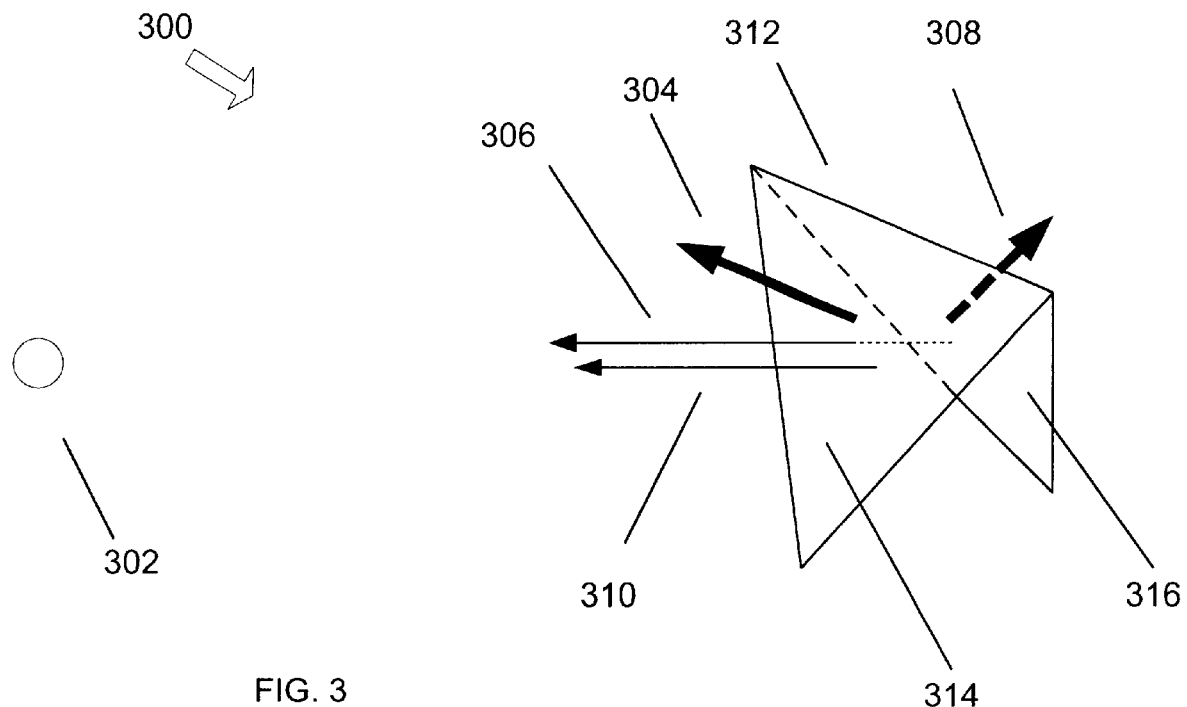
FIG. 3 shows a silhouette edge embodiment in accordance with one embodiment of the present invention.

FIG. 3 illustrates an embodiment 300 of a type of edge known as a silhouette edge in accordance with the present invention. A point 302 is defined as a camera point, e.g. a point from which the displayed size, position, and angle of the object will be determined. A vector 306 is determined between camera point 302 and face of a polygon 314. Vector 306 may be referred to as the camera vector for polygon 314. Likewise polygon 316 has face normal 308 and camera vector 310.

Silhouette edge 312 comprises a boundary between polygon 314, which "faces" camera point 302, and polygon 316, which "faces away from" camera point 302. A polygon is said to face the camera point 302 when it has a camera vector which makes an acute angle with its face normal, e.g. when the dot product of the camera vector and the face normal is positive. Likewise, a polygon faces away from camera point 302 when its camera vector makes an obtuse angle with its face normal, e.g. when the dot product of the camera vector and the face normal is negative.

Figure 4:
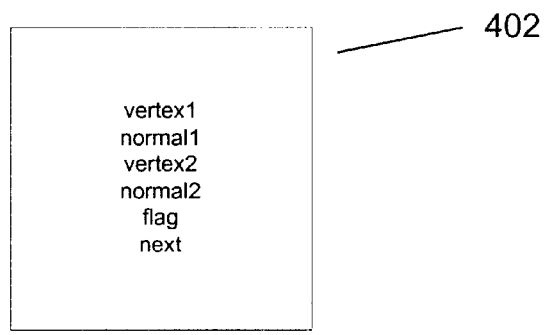
FIG. 4 shows an edge record embodiment in accordance with one embodiment of the present invention.

In accordance with the present invention, the computational complexity of displaying a 3D object may be reduced by displaying only silhouette edges of the mesh comprised by the object. Alternatively, silhouette mesh edges may be displayed with the regions between polygons mapped with a solid or simplified texture. A table of all edges of the object mesh may be created and edges which are silhouette edges for a particular camera point may be identified in the table. FIG. 4 shows an embodiment 402 of a record of the edge table in accordance with the present invention. Edge record 402 includes identifications of each vertex of the edge and a normal of each vertex. Edge record 402 comprises a flag which has a value indicating whether the edge is a silhouette edge according to the present camera point. Edge record 402 further includes a field to hold a pointer to another edge record. Use of this pointer is explained more fully in conjunction with FIG. 5. Of course, there are numerous manners of implementing records in a computer system and the particular record described herein is merely one of the possibilities.

Figure 5:
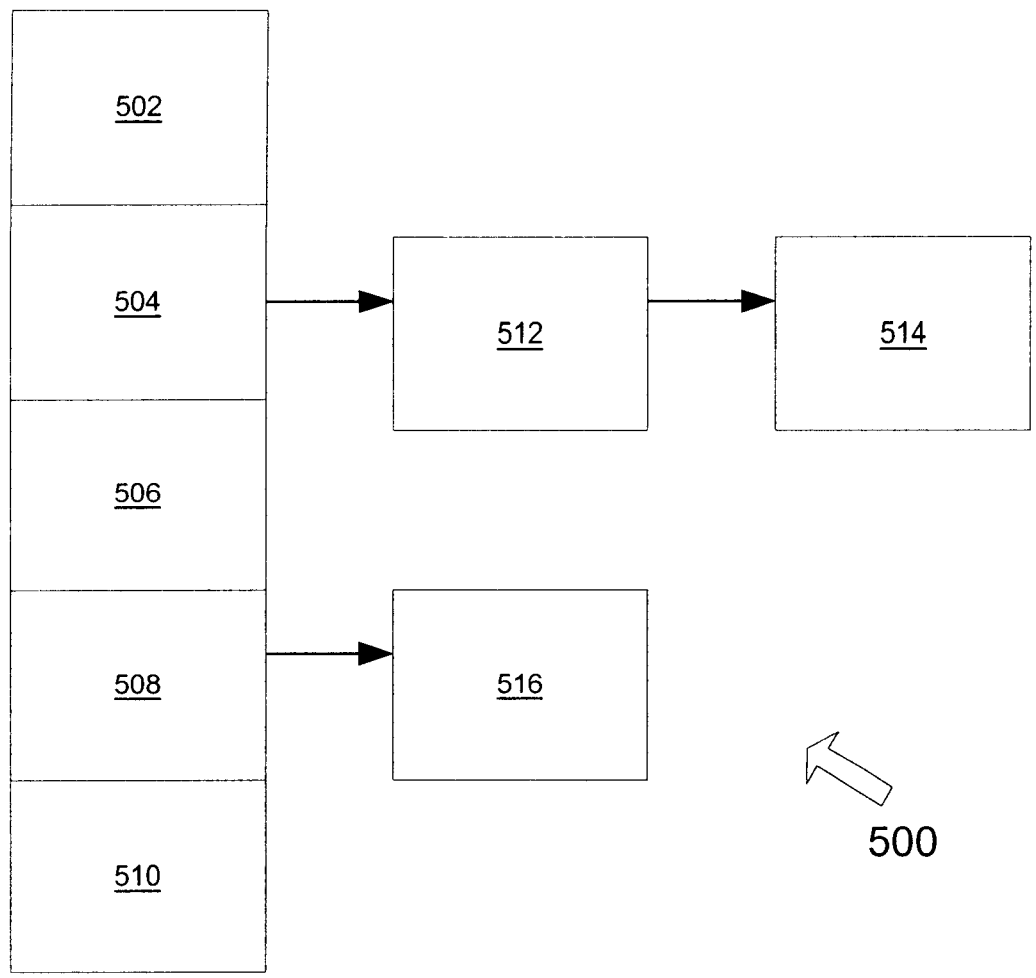
FIG. 5 shows an edge table in accordance with one embodiment of the present invention.

FIG. 5 shows an embodiment 500 of an edge table in accordance with the present invention. Table 500 includes edge records 502, 504, 506, 508, 510, 512, 514, and 516. The position of an edge record in the table may be determined by a hash value. The hash value of a record may be determined from the vertices of the record's edge with relatively low computational complexity (as compared to the complexity of computing a fully unique hash value). The hash value may be used to index into the edge table. However there is a possibility that the hash values for two edges of the mesh will be the same. In other words, it is possible for an edge record to be indexed by a value which is not unique in the table. Such edge records are shown at 504 and 508, for example. When the hash value for an edge record is not unique, the edge record points to a next edge record with the same hash value. For example, edge record 504 contains a pointer to edge record 512 which itself contains a pointer to edge record 514. Each of edge records 504, 512, and 514 are indexed by a same hash value. Such edges may be distinguished in the table by means other than the hash value, for example, by way of the values of the vertices stored in the edge records.

Figure 6:
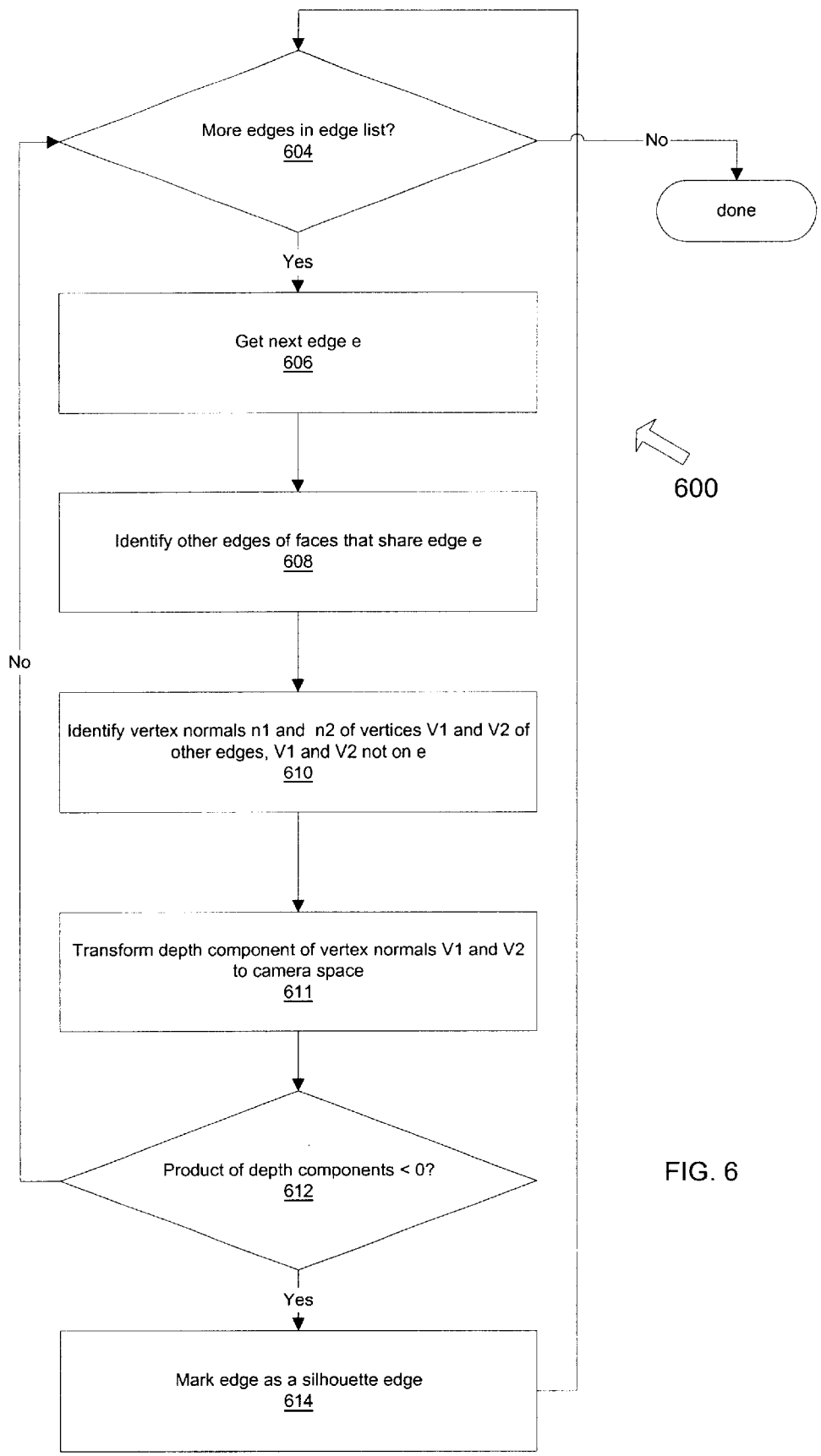
FIG. 6 shows a method in accordance with one embodiment of the present invention.
Figure 7:
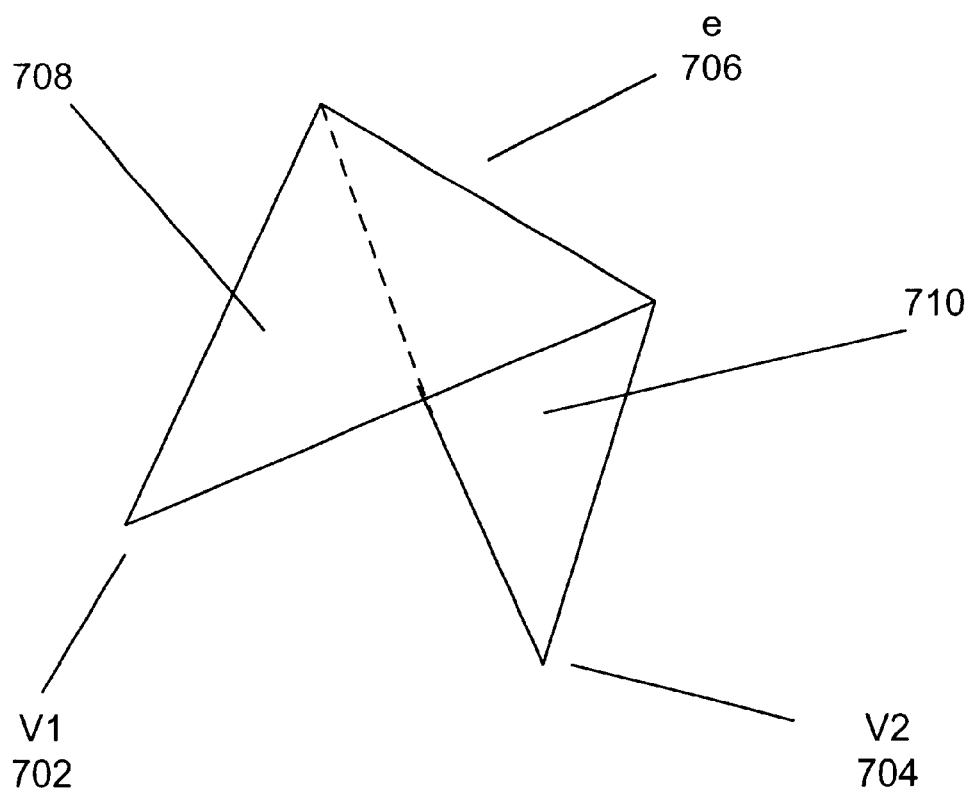
FIG. 7 shows a shared edge in accordance with one embodiment of the present invention.

FIG. 6 shows a method embodiment 600 in accordance with the present invention. At 604, a check is made to determine if more edges are in the edge list. If not, the method concludes. If yes, a next edge e is retrieved at 606. At 608, the edge list is examined to identify other edges of polygons that share edge e. Two faces share an edge when the edge is comprised by each polygon. At 610, vertex normals V1 and V2 are identified for vertices of the polygons which are not comprised by the shared edge. Referring momentarily to FIG. 7, polygons 708 and 710 share edge 706. Vertices 702 and 704 are vertices of the "other edges" as referred to at 610.

At 611 normals V1 and V2 are transformed to camera space. This operation may also be referred to as "projecting the normals into camera space", or "projecting the normals onto the depth (z) axis". Camera space is a coordinate system having its origin at the camera point and a coordinate axis (typically the "z" axis) indicative of a depth dimension of the display. In other words, typical displays have only two surface dimensions, height and width, whereas 3D objects comprise a third dimension, depth, which is simulated on two dimensional displays using depth perspective and other techniques. Often the depth dimension is described as the distance a displayed object appears "inside" the display, e.g. along the camera space z-axis, although of course objects are displayed only on the display surface. The following formula illustrates an embodiment of a transformation of a normal vector to camera space:

$$\underset{\text{vector}}{\underset{\text{normal}}{[V_x V_y V_z]}} \underset{\text{matrix}}{\underset{\text{transformation}}{\begin{bmatrix} C_{x1} C_{y1} C_{z1} \\ C_{x2} C_{y2} C_{z2} \\ C_{x3} C_{y3} C_{z3} \end{bmatrix}}} = \underset{\text{vector}}{\underset{\text{transformed normal}}{[V'_x V'_y V'_z]}}$$

To transform only the depth (z) component of the normal vector to camera space (and thus save on computational complexity), the following operation may be employed using only the z-column of the transformation matrix:

$$\underset{\text{vector}}{\underset{\text{normal}}{[V_x V_y V_z]}} \underset{\text{matrix}}{\underset{\text{transformation}}{\begin{bmatrix} C_{z1} \\ C_{z2} \\ C_{z3} \end{bmatrix}}} = \underset{\text{vector}}{\underset{\text{transformed normal}}{[V'_z]}}$$

Vertices and normals of an object are typically defined with respect to an object coordinate system, in which a point which moves with the object is selected as a reference point and vertices and normals are defined relative to a coordinate system fixed by this point. As an object moves in camera space the coordinates of its vertices and the direction of its normals change in camera space to reflect the object's change in position. However, the coordinates and directions in object space do not change because the coordinate system relative to which they are defined moves with the object.

Referring again to FIG. 6, at 612 the depth components ($V'_z$ in the above formula) of the transformed vertex normals V1 and V2 are multiplied. If the product is negative, the edge is marked as a silhouette edge at 614. If not negative, the edge is not marked as a silhouette edge and the method returns to 604 to check for more edges in the edge list.

In general, the faces of a mesh which share an edge are identified. For these faces, the normals of vertices of the faces not comprised by the edge are identified and the depth components (in one embodiment, the z-components) of the normals are multiplied in camera space. (In other words, the normals are projected into camera space, and then the depth components multiplied). When the product of multiplying the depth components of the normals has a first sign (in one embodiment, a negative sign), the edge is marked as a silhouette edge. Once all silhouette edges for a particular camera point are identified, the object may be displayed in silhouette. The edges identified as silhouette edges may be displayed, possibly along with other edges. Alternatively, the silhouette edges may be displayed and regions between displayed silhouette edges may be shaded with a solid or simplified texture.

Figure 8:
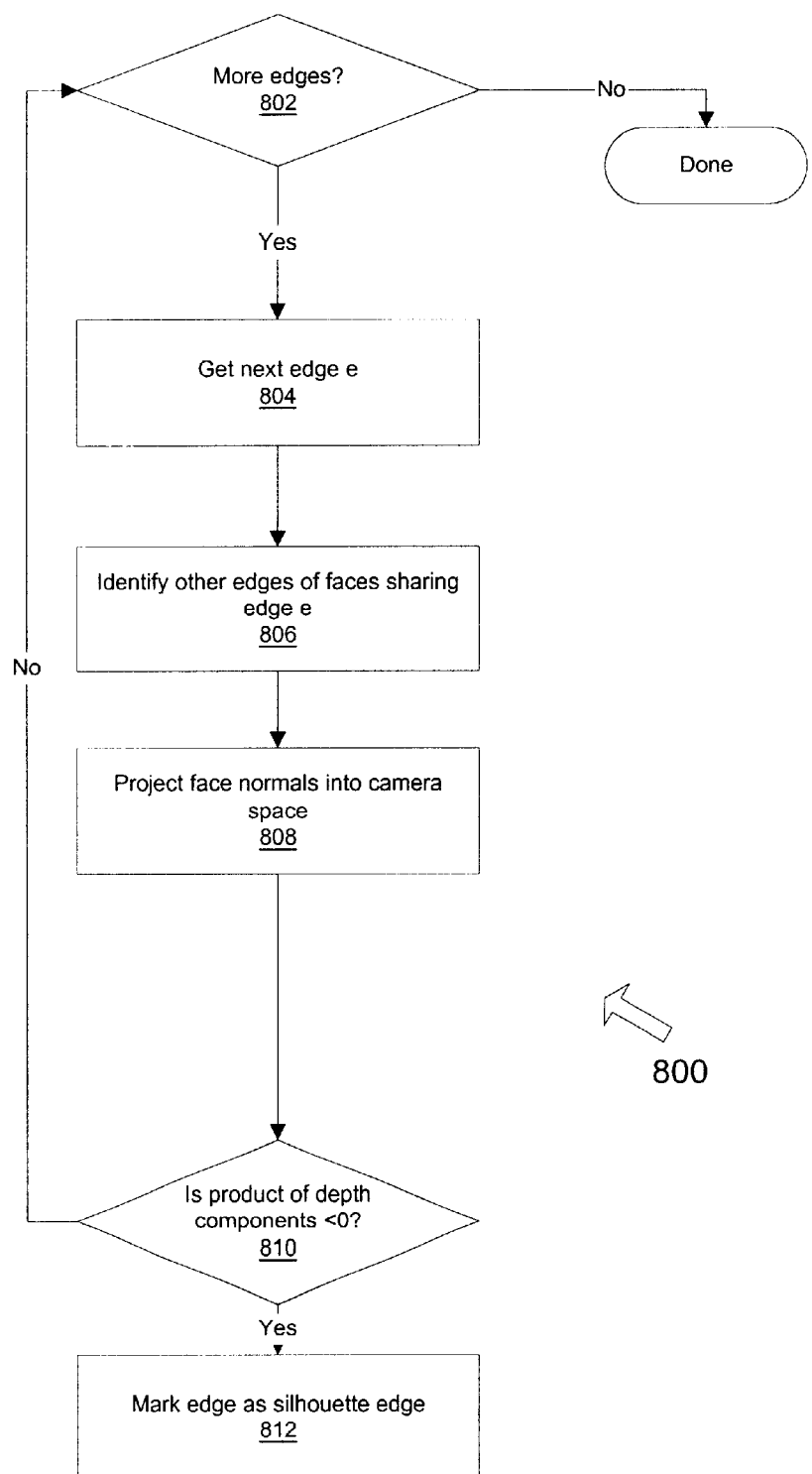
FIG. 8 shows another method in accordance with one embodiment of the present invention.

FIG. 8 shows a method embodiment 800 according to another aspect of the present invention. If at 802 there are more edges to examine in the edge list, the next edge e is retrieved at 804, otherwise the method concludes. At 806, other edges of polygons sharing edge e are identified. At 808, the face normals of the polygons sharing edge e are projected into camera space. The depth components of the transformed face normals are multiplied at 810. If the product has a first sign (in one embodiment, negative), the edge is identified as a silhouette edge at 812. Otherwise the method returns to 802 to determine if there are more edges to process.

Embodiments of the present invention may reduce the computational complexity of displaying 3D objects by providing a recognizable representation of the object for display without rendering all edges of the object or employing complex texture mapping for the regions between edges. Further, displayed edges may be identified by way of transformation of one coordinate of the object vertices and normals instead of three coordinates, resulting in a substantial reduction in computational complexity.

Figure 9:
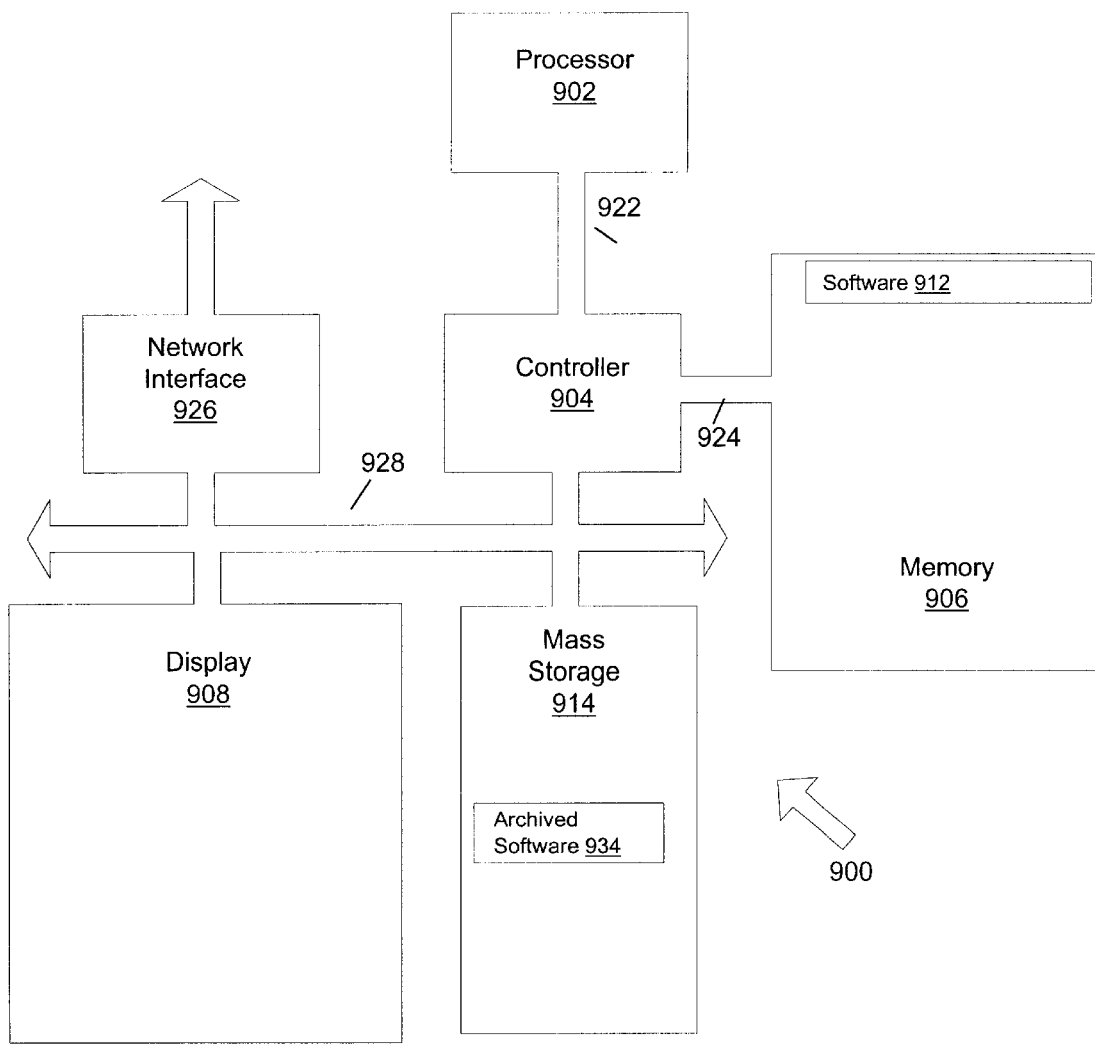
FIG. 9 shows a system embodiment in accordance with one embodiment of the present invention.

FIG. 9 shows an apparatus embodiment 900 in accordance with the present invention. Embodiment 900 comprises a processor 902 coupled to a controller 904 by way of a processor bus 922, commonly referred to as a front side bus. Bus controller 904 is coupled to memory 906 via memory bus 924. Bus controller 904 is also coupled to various peripheral devices such as mass storage 914, network interface 926, and display 908 via I/O bus 928. Network interface 926 provides apparatus 900 with access to networks such as the Internet or corporate intranets.

Memory 906 stores software 912 to determine and display a silhouette representation of a 3D object. Memory 906 is typically a form of random access memory (RAM), such as DRAM, SRAM, and flash. Memory 906 could also comprise a read only memory (ROM). Memory 906 supplies the instructions of software 912 stored therein to processor 902 for execution. Mass storage 914 may store archived version 934 of software 912 for loading into memory 906 for execution.

Execution of software 912 may result in display a silhouette representation of a 3D object on display 908 in accordance with, for example, the method embodiments of FIGS. 6 and 8.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method in a computer system comprising:
   identifying faces of a mesh which share an edge;
   identifying normals of vertices of the faces not comprised by the edge;
   multiplying depth components of the normals in camera space; and
   when the product of multiplying the depth components of the normals has a first sign, identifying the edge as a silhouette edge.

2. The method of claim 1 further comprising:
   displaying edges of the mesh identified as silhouette edges.

3. The method of claim 2 further comprising:
   displaying one of a solid color and simple texture in regions of the mesh bounded by the silhouette edges.

4. A method comprising:
   identifying faces of a mesh which share an edge;
   identifying normals of the faces;
   multiplying depth components of the normals in camera space; and
   when the product of multiplying the depth components has a first sign, identifying the edge as a silhouette edge.

5. The method of claim 4 further comprising:
   displaying edges of the mesh identified as silhouette edges.

6. The method of claim 5 further comprising:
   displaying one of a solid color and simple texture in regions of the mesh bounded by the silhouette edges.

7. An article comprising:
   a machine-readable medium having stored thereon instructions which, when executed by a processor, result in
   identifying faces of a mesh which share an edge;
   identifying normals of vertices of the faces not comprised by the edge;
   multiplying depth components of the normals in camera space; and
   when the product of multiplying the depth components of the normals has a first sign, identifying the edge as a silhouette edge.

8. The article of claim 7 in which the instructions, when executed by the processor, further result in:
   displaying edges of the mesh identified as silhouette edges.

9. The article of claim 7 in which the instructions, when executed by the processor, further result in:
   displaying one of a solid color and simple texture in regions of the mesh bounded by the silhouette edges.

10. An article comprising:
    a machine-readable medium having stored thereon instructions which, when executed by a processor, result in
    identifying faces of a mesh which share an edge;
    identifying normals of the faces;
    multiplying depth components of the normals in camera space; and
    when the product of multiplying the depth components has a first sign, identifying the edge as a silhouette edge.

11. The article of claim 10 in which the instructions, when executed by the processor, further result in:
    displaying edges of the mesh identified as silhouette edges.

12. The article of claim 10 in which the instructions, when executed by the processor, further result in:
    displaying one of a solid color and simple texture in regions of the mesh bounded by the silhouette edges.

13. A system comprising:
    a processor; and
    a machine-readable medium having stored thereon instructions which, when executed by the processor, result in
    identifying faces of a mesh which share an edge;
    identifying normals of vertices of the faces not comprised by the edge;
    multiplying depth components of the normals in camera space; and
    when the product of multiplying the depth components of the normals has a first sign, identifying the edge as a silhouette edge.

14. The system of claim 13 in which the instructions, when executed by the processor, further result in:
    displaying edges of the mesh identified as silhouette edges.

15. The system of claim 13 in which the instructions, when executed by the processor, further result in:
    displaying one of a solid color and simple texture in regions of the mesh bounded by the silhouette edges.

* * * * *